(12) United States Patent
Disser et al.

(10) Patent No.: US 7,670,229 B2
(45) Date of Patent: Mar. 2, 2010

(54) DISPLACEMENT UNIT AND JOINT SHAFT INCLUDING SUCH A DISPLACEMENT UNIT

(75) Inventors: Claus Disser, Seligenstadt (DE); Mathias Lutz, Tuebingen (DE)

(73) Assignee: Shaft-Form-Engineering GmbH, Muehlheim (DE)

( * ) Notice: Subject to any disclaimer, the term of this patent is extended or adjusted under 35 U.S.C. 154(b) by 0 days.

(21) Appl. No.: 12/056,479

(22) Filed: Mar. 27, 2008

(65) Prior Publication Data

US 2008/0242432 A1  Oct. 2, 2008

Related U.S. Application Data

(63) Continuation of application No. PCT/EP2006/009343, filed on Sep. 26, 2006.

(30) Foreign Application Priority Data

Sep. 27, 2005   (DE)   ........................ 10 2005 046 301
Sep. 19, 2006   (DE)   ........................ 10 2006 044 590

(51) Int. Cl.
*F16D 3/06* (2006.01)

(52) U.S. Cl. ........................ 464/162; 464/183; 464/179

(58) Field of Classification Search ................. 464/162, 464/183, 179, 145; 280/777
See application file for complete search history.

(56) References Cited

U.S. PATENT DOCUMENTS

| | | | |
|---|---|---|---|
| 4,406,176 A | 9/1983 | Numazawa et al. | |
| 6,234,908 B1 | 5/2001 | Jacob | |
| 6,241,617 B1 | 6/2001 | Jacob | |
| 6,306,045 B1 | 10/2001 | Jacob | |
| 6,343,993 B1 | 2/2002 | Duval et al. | |
| 6,354,953 B1 | 3/2002 | Herchenbach et al. | |
| 6,379,255 B1 | 4/2002 | Cermak et al. | |
| 6,510,756 B2 * | 1/2003 | Aota | 74/492 |
| 7,025,686 B1 * | 4/2006 | Aiken | 464/162 |
| 7,163,462 B2 * | 1/2007 | Okude et al. | 464/183 |
| 7,281,984 B2 * | 10/2007 | Foster-Hamilton et al. | 464/162 |
| 2003/0171154 A1 | 9/2003 | Farrace et al. | |
| 2005/0153782 A1 | 7/2005 | Jacob et al. | |

FOREIGN PATENT DOCUMENTS

| | | |
|---|---|---|
| DE | 198 31 016 A1 | 1/2000 |
| DE | 198 31 010 A1 | 2/2000 |
| DE | 198 39 469 C1 | 5/2000 |
| DE | 199 11 111 C1 | 1/2001 |
| DE | 199 43 880 C1 | 6/2001 |
| DE | 102 09 933 A1 | 10/2003 |

OTHER PUBLICATIONS

International Search Report dated Jan. 24, 2007 (Three (3) pages).

* cited by examiner

*Primary Examiner*—Aaron M Dunwoody
(74) *Attorney, Agent, or Firm*—Crowell & Moring LLP

(57) ABSTRACT

A displacement unit and a jointed shaft which includes such a displacement unit. The displacement unit is formed of an external part and of an internal part which can be displaced in an axial direction in the external part, in which the external and internal parts have guide paths provided with balls arranged in the guide paths for the transmission of torque.

20 Claims, 2 Drawing Sheets

DISPLACEMENT UNIT AND JOINT SHAFT INCLUDING SUCH A DISPLACEMENT UNIT

CROSS REFERENCE TO RELATED APPLICATIONS

This application is a continuation of international patent application no. PCT/EP2006/009343, filed Sep. 26, 2006, designating the United States of America, and published in German on Apr. 5, 2007 as WO/2006/036344, the entire disclosure of which is incorporated herein by reference. Priority is claimed based on Federal Republic of Germany patent application nos. DE 10 2005 046 301.0, filed Sep. 27, 2005, and DE 10 2006 044 590.2, filed Sep. 19, 2006.

BACKGROUND OF THE INVENTION

The invention relates to a displacement unit with a tubular outer part, the inner face of which has outer running tracks at least in part, with an inner part which is axially displaceable in the outer part and the outer face of which has inner running tracks at least in part, and with balls arranged for torque transmission, respectively, in outer running tracks and inner running tracks associated with each other in pairs. The invention further relates to a jointed shaft with a displacement unit.

Displacement units of this type are known, for example, from U.S. Pat. No. 6,234,908 (=DE 198 31 010), U.S. Pat. No. 6,241,617 (=DE 198 31 016) and U.S. Pat. No. 6,306,045 (=DE 199 11 111) and are used to offset or compensate for a telescopic displacement, which is necessary for assembly and/or occurs in operation of a shaft that is used, for example, in the drivetrain of a motor vehicle. Beyond the normal displacement path that is provided in these displacement units in operation or is possible during assembly, a further axial telescoping of the displacement unit or the shaft connected therewith is not provided or possible.

In a head-on collision of a motor vehicle, the entire vehicle is partially strongly compressed, depending on the severity of the collision. As a result, a substantial partial axial load acts also on the longitudinal vehicle driveshaft. To safely prevent the shaft from buckling and penetrating the passenger compartment, the shaft must therefore be capable of axially contracting. In the known displacement units, this is possible only to a very limited degree, so that the longitudinal shaft can buckle and can potentially endanger the vehicle occupants.

Further, in U.S. Pat. No. 6,379,255 (=DE 199 43 880) a drive arrangement is proposed in which two shaft sections of a longitudinal drive shaft are interconnected by a center joint. The diameters of the two shaft sections are such that the shaft sections can telescope into each other in case of a collision. To this end the cage of the center joint is constructed as a predetermined breaking point which fails in a collision and thereby enables the two shaft sections to telescope. In addition, the transmission-side joint and the differential-side joint are constructed as slip joints. Particularly in applications requiring relatively large, non-destructive changes in the axial length of the drive shaft for assembly and/or in operation, the comparatively small non-destructive displacement path of the slip joints has proven to be a disadvantage in this known drive arrangement.

SUMMARY OF THE INVENTION

It is therefore an object of the present invention to provide a displacement unit and a jointed shaft, which enable a largely force-free axial reduction in length if a predefined axial force is exceeded and which are meant to prevent an uncontrolled buckling of a shaft or a shaft section.

A further object of the invention is to make the fixed constant velocity joints especially compact, to save weight and to reduce the residual imbalances in a jointed shaft.

Another object of the invention is to provide a jointed shaft in which the axial forces acting on the center bearing are substantially reduced and the vibration behavior of the intermediate bearing is improved, so that noise generation is also reduced.

Yet another object of the invention to make the jointed shaft particularly cost-effective to manufacture and to use as many identical components as possible.

A still further object of the invention is to provide a jointed shaft which is easier to assemble and disassemble and which also makes possible different assembly sequences.

In a displacement unit of the above-described type, these objects of the invention are essentially achieved in accordance with the invention by connecting the outer part via a predetermined breaking point to a connecting segment whose inside diameter is greater than, or substantially equal to, the outside diameter of the outer part. As a result, the predetermined breaking point ruptures in a head-on collision because of the axial force acting on the displacement unit, such that the outer part can be displaced into the connecting segment and the hollow shaft tube that is optionally connected therewith.

To enable a largely force-free displacement of the outer part within the connecting segment, the inside diameter of the connecting segment is preferably greater than, or at most equal to, the outside diameter of the outer part. Alternatively, it may make sense to absorb deformation energy during the change in length of the displacement unit in a crash. This can be achieved by making the connecting segment or the adjoining tubular shaft slightly smaller than the outside diameter of the outer part, optionally downstream of an insertion section.

The outer part can then still be reliably inserted into the connecting segment, without the risk that it will buckle, but impact energy is dissipated in addition. This can also be achieved, for example, by providing the inner face of the connecting segment and/or the outer face of the outer part with relatively easily deformed ribs or similar protrusions.

In any case, however, the displacement unit according to the invention makes possible a deformation of the displacement unit in a defined direction when a defined force is exceeded. The force at which the predetermined breaking point of the displacement unit fails can be set in a defined manner. Because in the displacement unit according to the invention the entire outer part, together with the inner part received by it, can be displaced into the connecting segment and the optionally connected tubular shaft, the realizable crash path is very large.

Unlike in a shaft section that is configured as a collapsible tube, however, this does not mean that different and, in particular, larger tube diameters of the individual shaft sections must be provided. Therefore, the overall space required for the displacement unit according to the invention can be kept small.

According to one preferred embodiment of the invention, the predetermined breaking point is formed as a connecting region radially between the inner face of the outer part and the outer face of the connecting segment. To facilitate rupture of the predetermined breaking point, the transitions between the outer part and the connecting segment can be constructed with small curvature radii. It is also possible to make the predetermined breaking point S-shaped or Z-shaped in cross section.

As an alternative or in addition, the predetermined breaking point can be a constriction, notch, perforation and/or a similar weakening of the material. With these measures the force at which the predetermined breaking point fails can be adjusted depending on the requirements.

The outer part, the connecting segment and the predetermined breaking point are configured in such a way that when a defined force acting axially on the outer part is exceeded, the predetermined breaking point fails and the outer part is displaceable into the connecting segment to realize a large crash path.

If a cover is provided on the outer part, on the connecting segment and/or on the predetermined breaking point, the outer part can be closed in the direction toward the connecting segment. The cover can then serve as a limit stop for the inner part to prevent the inner part from being displaced out of the outer part in operation or in a crash. However, the cover can also be mounted on the outer part, on the connecting segment and/or on the first breaking point via an additional predetermined breaking point, so that in a crash, the cover is also separated and the inner part can be displaced out of the outer part. Depending on the design of the displacement unit and the components connected thereto, this can provide an additional displacement path.

The objects underlying the invention are further achieved by a jointed shaft which can be used, in particular, as a longitudinal vehicle shaft and which comprises at least one displacement unit and at least one shaft tube that is connected to a connecting segment of a displacement unit and has an inside diameter greater than, or substantially equal to, the outside diameter of the outer part of the at least one displacement unit. In principle, this is to enable a nearly force-free displacement of the outer part of the displacement unit into the jointed shaft. However, if a defined reduction of the crash force is to occur when the displacement unit is displaced into the tubular shaft, this can be achieved by the measures described above.

A preferred embodiment of the jointed shaft according to the invention comprises at least two shaft sections, each comprising a shaft tube, interconnected by a center joint. At their ends opposite the center joint, the shaft sections have a transmission-side and a differential-side joint. Preferably, the transmission-side joint, the differential-side joint and the center joint are configured as fixed joints, particularly as opposed path joints, whose cage is guided in the outer hub of the respective opposed path joint. This embodiment of the jointed shaft therefore makes it possible to use three at least substantially similarly constructed joints so as to minimize the production costs of the jointed shaft. In addition, compared to slip joints, each of these fixed joints is adapted to allow particularly large angles in operation between the individual shaft sections or the components connected thereto. The configuration of the fixed joints as opposed path joints with cages guided in the outer hub makes possible a particularly cost-effective production and at the same time provides good reliability in operation.

Independent of the features described above, a jointed shaft according to the invention has two roller displacement units, at least one of which is associated with and disposed near the center joint, such that the two shaft sections are axially movable relative to each other. Arranging the roller displacement units at a point remote from the transmission output or the differential input makes it possible to make both the roller displacement units and the fixed constant velocity joints particularly compact. This results in considerable weight savings and smaller residual imbalances because of the smaller masses. Noise generation during operation of the jointed shaft according to the invention can be reduced as a result.

The axial forces acting on the center bearing are also substantially reduced because at least one roller displacement unit is arranged near the center joint and therefore near the intermediate bearing. This axial force decoupling also has the effect of reducing noise in operation. Furthermore, in the embodiment of the jointed shaft according to the invention an intermediate bearing does not have to be axially flexible, so that possible noise development because of the vibration behavior of the intermediate bearing is also reduced.

A further embodiment of the invention envisions two roller displacement units associated with and arranged closely adjacent the center joint of the jointed shaft. If both roller displacement units are positioned substantially in the center of the jointed shaft, it is possible to use three identically constructed fixed constant velocity joints for the jointed shaft. The jointed shaft according to the invention is therefore made of only a very small number of different components, which results in substantial cost savings based on the principle of using identical parts.

To minimize the masses present in the area where the jointed shaft is connected to a transmission or differential, the roller displacement units are arranged as far from the connecting points as possible, for example, in the center of the jointed shaft. Thus, in the jointed shaft, at most the very small masses of the outer fixed constant velocity joints contribute to potential imbalances of the entire system through possible minimal journal eccentricities.

In this embodiment of the jointed shaft, assembly is also facilitated compared to conventional jointed shafts. For example, the two shaft sections can be axially moved in relation to each other, thereby enabling a very large displacement path. This results in a very small installation and deinstallation length, making assembly and disassembly significantly easier. In addition, different assembly sequences can be used as a function of the other requirements and boundary conditions. Assembly can also be carried out on the vehicle floor, for example, starting with the center bearing.

According to another embodiment of the invention, one of the two roller displacement units can be associated with and arranged near the center joint and the other of the two roller displacement units can be associated with and arranged near the transmission-side or differential-side fixed constant velocity joint. The two roller displacement units can be provided on the same shaft section or each on a different shaft section. These two embodiments each ensure that the two shaft sections are axially displaceable in relation to each other and at least one roller displacement unit is positioned near the center joint.

A particularly compact jointed shaft can be realized by connecting the inner part of the second displacement unit to the inner hub of the center joint and the inner part of the first displacement unit to the outer hub of the center joint. The inner part of the second displacement unit can even be integrally formed with the inner hub of the center joint, or it can be directly inserted therein. Likewise, the outer hub of the center joint can be integrally formed with the inner hub of the first displacement unit. In a preferred embodiment, however, the inner part of the first displacement unit is connected to a cap of the outer hub of the center joint.

A further embodiment of the invention concept provides that the inner part of a displacement unit, preferably the first displacement unit, is supported in an intermediate bearing. The center joint is therefore held in the intermediate bearing, which is fixed, for example, to the chassis of a vehicle, so that axial vibrations from the two displacement units associated with the center joint can be compensated in operation and during assembly.

To save weight and ensure telescopability of the shaft in a head-on crash, the two shaft sections of the jointed shaft are at least partly tubular. Preferably the fixed constant velocity joints provided at the ends of each shaft section opposite the center joint, i.e., the transmission-side and the differential-side fixed joints, are each connected to the shaft sections with their outer hubs. The inner hub of the transmission-side or the differential-side fixed joint can be provided with a profiled receiving opening, so that a transmission output journal or a differential input journal can be inserted into the inner hub in a rotationally fixed manner. This simplifies assembly compared to the known flanged connection.

To prevent imbalances, jointed shafts are typically balanced at the end of production. A problem in the known jointed shafts, which are connected by flanged connections and consequently over a large diameter, is that possible eccentricities, which result at the connecting points only when the shaft is installed in the vehicle, adversely affect the balance quality of the entire system despite the high balance quality of the jointed shaft as an individual component. In the jointed shaft according to the invention, centering at the connecting points is realized directly via journals that are inserted into the inner hubs of the fixed constant velocity joint. This has the effect of substantially reducing imbalances because of the improved centering via the journal connection. Noise occurring in operation can also be reduced as a result.

The elimination of the flange in this insertion solution further saves weight in the fixed constant velocity joints. In addition, the highly compact design of the fixed constant velocity joint with a slip joint increases the design freedom regarding the remaining vehicle components and reduces the overall space required. The center joint can likewise be provided with an inner hub, which makes possible a slip coupling with one of the roller displacement units, for example.

Further embodiments, advantages and possible applications of the invention will become evident from the following description of an embodiment and the drawing. All the features described and/or illustrated, either by themselves or together in any combination, constitute the subject matter of the invention, regardless of their summarization in the claims or the relationship of the claims.

BRIEF DESCRIPTION OF THE DRAWING

The invention will be described in further detail hereinafter with reference to an illustrative preferred embodiment shown in the accompanying drawing figures, in which.

DETAILED DESCRIPTION OF PREFERRED EMBODIMENTS

Figure 1:
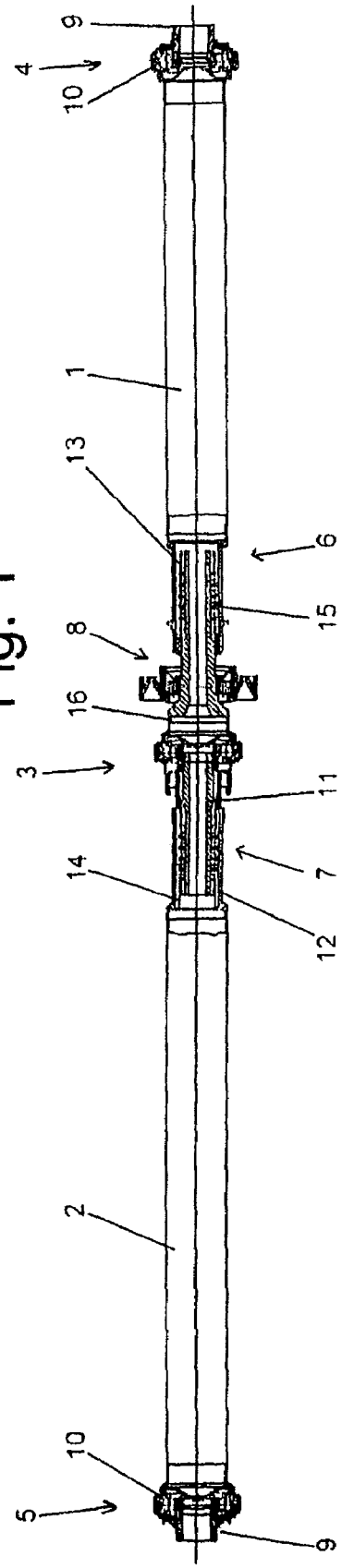
FIG. 1 is a schematic longitudinal section of a jointed shaft according to the invention.

The jointed shaft shown in FIG. 1 comprises a first shaft section 1 and a second shaft section 2, each of which is formed as a hollow shaft tube. The two shaft sections 1 and 2 are interconnected by a center joint 3, which in the illustrated embodiment is constructed as a fixed opposed path joint. The transmission-side end opposite the center joint of the first shaft section 1 is connected to a transmission-side joint 4. Likewise, the differential-side end opposite the center joint 3 of the shaft section 2 is connected to a differential-side joint 5. The transmission-side joint 4 and the differential-side joint 5 are also constructed as fixed opposed path joints.

The center joint 3 is associated with a first displacement unit 6 through which the center joint 3 is connected to the first shaft section 1, and with a second displacement unit 7 through which the center joint 3 is connected to the second shaft section 2. The center joint 3 is further associated with an intermediate bearing 8, which in the illustrated embodiment is mountable to a vehicle chassis via a resilient member. The intermediate bearing 8 is positioned on the first displacement unit 6.

The fixed opposed path joints 3, 4 and 5 each comprise an inner hub 9 configured as a sleeve, into which an axle stub or a shaft end can be inserted in the transmission-side joint 4 and the differential-side joint 5. On the outer face of the inner hub 9 inner tracks are formed. The fixed opposed path joints each further comprise an outer hub 10, on the inner face of which outer tracks are formed. Balls for torque transmission are arranged in the tracks, which are configured, for example, as described in published US patent application no. US 2005/0153782 (=DE 102 09 933). The balls are received in the openings of a cage, which is centered and guided in the outer hub 10, particularly in cage centering surfaces of the outer hub 10, of the fixed opposed path joints.

Figure 1A:
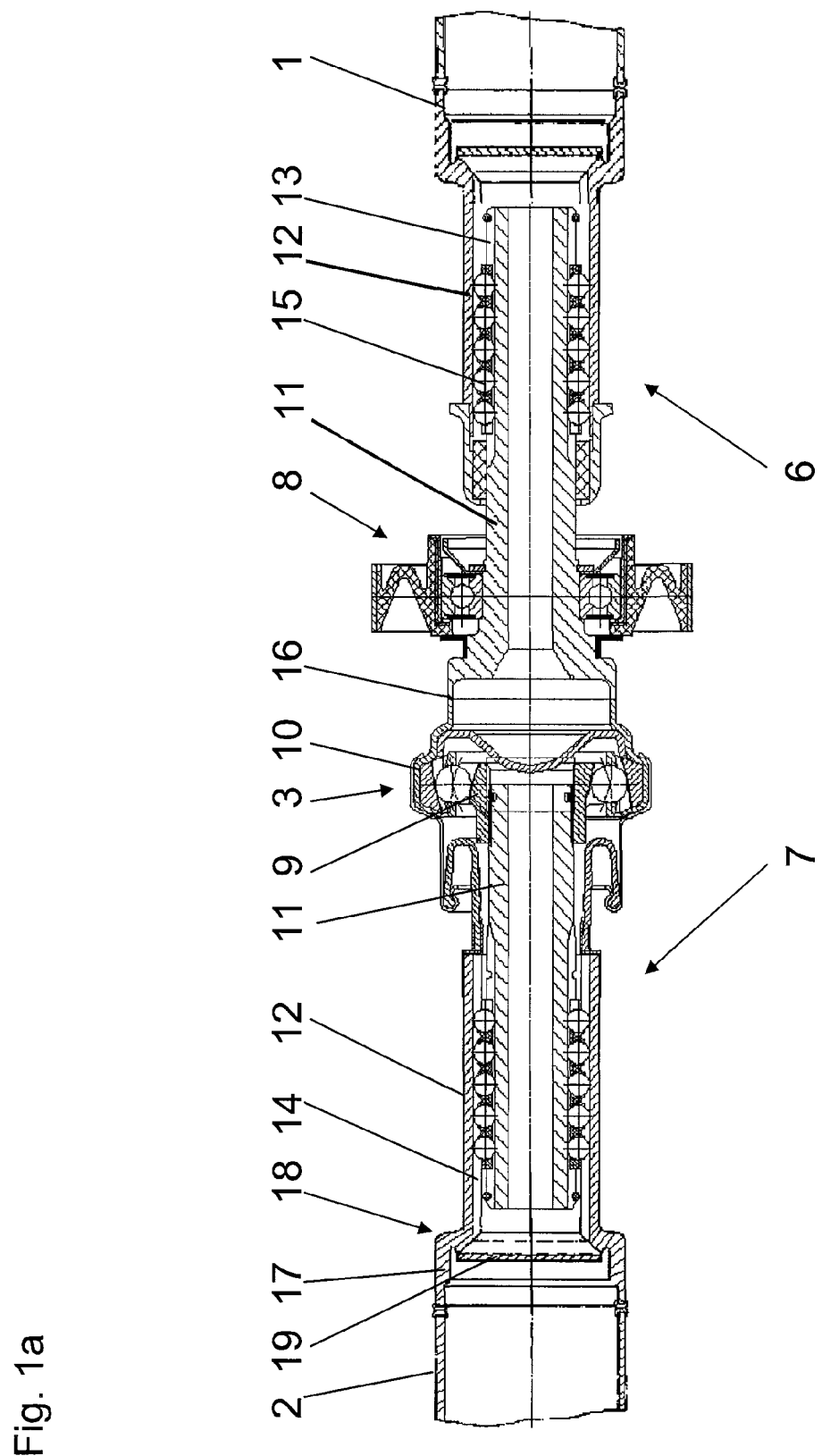
FIG. 1*a* is an enlarged detail view of central portion of the jointed shaft of FIG. 1.

As can be seen from FIG. 1*a*, the two displacement units 6 and 7 each comprise an inner part 11 and an outer part 12 in which the inner part 11 is displaceable. On the outer face of the inner part 11 and on the inner face of the outer part 12, inner tracks 13 and outer tracks 14 are formed, respectively, which extend at least substantially in the axial direction. In this embodiment, in the inner tracks 13 and the outer tracks 14, which are associated with each other in pairs, a plurality of balls 15 is provided for torque transmission and guided in a cage.

As shown in FIG. 1*a*, the inner part 11 of the second displacement unit 7 is connected to the inner hub 9 of the center joint 3. The inner part 11 of the first displacement unit 6 is connected to a cap 16, which encloses the outer hub 10 of the center joint 3 and is rotationally fixed thereto. In this manner, the two displacement units 6 and 7 are associated with the center joint 3 and are arranged adjacent thereto, so that axial movements of the two shaft sections 1 and 2 are compensated by the displacement units 6 and 7 and are not transmitted to or through the center joint 3.

Figure 2:
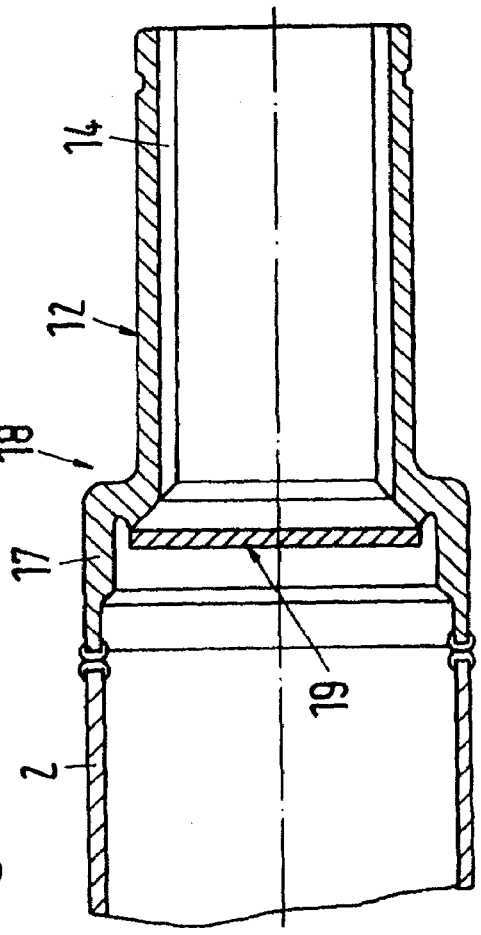
FIG. 2 is a longitudinal section of the outer part of a displacement unit according to the invention.

As can be seen from the schematic view of FIG. 2, a connecting segment 17 is formed on the outer part 12 to connect the outer part 12 of the displacement unit 7 to the second shaft section 2. The connecting segment 17 is connected to the outer part 12 by a predetermined breaking point 18, which in the embodiment shown extends radially. The predetermined breaking point 18 can comprise a weakening of the material, such as a constriction, notching, perforation, or the like.

In the illustrated embodiment, the inside diameter of the shaft tube of the second shaft section 2 and the inside diameter of the connecting segment 17 are larger than the outside diameter of the outer part 12 of the second displacement unit 7. The first displacement unit 6 is likewise connected to the shaft tube of the first shaft section 1 by a connecting segment 17 and a predetermined breaking point 18. In the first displacement unit 6, the outside diameter of the outer part 12 is again smaller than the inside diameter of the first shaft section 1 or the connecting segment 17.

The outer part 12 of the two displacement units 6 and 7 is closed by a cover 19, which is connected to the outer part 12, for example, by electron welding. Unlike in the embodiment depicted in FIG. 2, the cover 19 can also be connected to the predetermined breaking point 18 or the connecting segment 17. The cover 19 limits the displacement path of the inner part 11 in the outer part 12. The connection between the cover 19 and the outer part 12 can also be formed as a predetermined breaking point.

Figure 3:
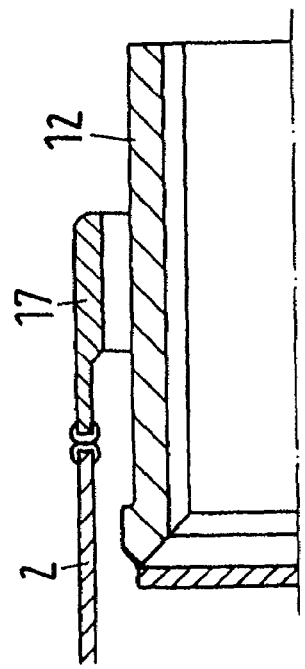
FIG. 3 is a longitudinal section of the outer part according to FIG. 2 after a crash.

If, in a crash, for example, a large axial force acts on the shaft sections 1 and 2 and thereby also on the outer parts 12 of the displacement units 6 and 7, the respective predetermined breaking points 18 of the two displacement units fail at the end of the displacement path of the displacement units 6 and 7, as illustrated in FIG. 3. As a result, the outer part 12 of each displacement unit can be displaced into the corresponding shaft section 1 or 2 in a substantially force-free manner.

This prevents the jointed shaft from buckling because the displacement units 6 and 7 are guided in the shaft sections 1 and 2. The large axial length of the two displacement units 6 and 7 combined makes it possible in such a crash-related failure of the two predetermined breaking points 18 to realize a very large additional displacement path (crash path), without the vehicle occupants being placed at risk.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A displacement unit for a jointed shaft, said displacement unit comprising:
   a tubular outer part having an inner face with outer tracks at least partially formed therein;
   an inner part which is axially displaceable in the outer part, said inner part having an outer face with inner tracks at least partially formed therein, said inner tracks being associated in pairs with respective outer tracks of said tubular outer part, and
   balls arranged in respective pairs of outer tracks and inner tracks for transmitting torque between said outer and inner parts;
   wherein said outer part is connected by a predetermined breaking point to a connecting segment having an inside diameter which is substantially equal to or greater than the outside diameter of said tubular outer part;
   wherein said connecting segment connects said outer part to a shaft section, and
   wherein the outer part, the connecting segment and the predetermined breaking point connecting the outer part to the connecting segment are configured such that when a defined axial force acting against the outer part is exceeded, the predetermined breaking point fails and the outer part is displaceable into the connecting segment.

2. A displacement unit as claimed in claim 1, wherein the predetermined breaking point is configured as a connecting region disposed radially between the inner face of the outer part and the outer face of the connecting segment.

3. A displacement unit as claimed in claim 1, wherein the predetermined breaking point is formed by weakening the material of said outer part or said connecting segment.

4. A displacement unit as claimed in claim 3, wherein said weakening is formed by restricting, notching or perforating the material.

5. A displacement unit as claimed in claim 1, further comprising a cover provided covering at least one of the outer part, the connecting segment and the predetermined breaking point, for closing the outer part relative to the connecting segment.

6. A displacement unit as claimed in claim 5, wherein said cover is fixed to at least one of the outer part, the connecting segment and the predetermined breaking point via a further predetermined breaking point.

7. A jointed shaft comprising at least one displacement unit as claimed in claim 1, and at least one shaft tube which is connected to a connecting segment of the at least one displacement unit, said shaft tube having an inside diameter which is greater than, or substantially equal to, the outside diameter of the outer part of the at least one displacement unit.

8. A jointed shaft as claimed in claim 7, wherein said jointed shaft is a longitudinal motor vehicle drive shaft.

9. A jointed shaft as claimed in claim 7, wherein said shaft comprises two shaft sections connected to each other by a center joint; each shaft section comprising a shaft tube, and wherein one of said shaft sections has a transmission connecting joint at its end opposite the center joint, and the other of said shaft sections has a differential connecting joint at its end opposite the center joint.

10. A jointed shaft as claimed in claim 9, wherein the transmission connecting joint, the differential connecting joint and the center joint are constructed as fixed joints.

11. A jointed shaft as claimed in claim 10, wherein said fixed joints are opposed path joints each comprising an outer hub and a cage which is guided in the outer hub of the respective opposed path joint.

12. A jointed shaft as claimed in claim 7, wherein said first displacement unit comprises an inner part which is supported in an intermediate bearing.

13. A jointed shaft as claimed in claim 7, wherein the two shaft sections are at least partly tubular, wherein the fixed constant velocity joints provided at the ends opposite the center joint of each shaft are each connected to the shaft sections by their outer hubs.

14. A jointed shaft as claimed in claim 7, comprising two shaft sections connected to each other in a rotationally fixed manner by a center joint, wherein said center joint is a fixed opposed path joint, and a fixed constant velocity joint is arranged at the end of each shaft section opposite said center joint; said jointed shaft further comprising two roller displacement units, at least one of said roller displacement units being arranged near the center joint.

15. A jointed shaft as claimed in claim 14, wherein the two shaft sections are axially movable relative to each other.

16. A jointed shaft as claimed in claim 14, wherein the two roller displacement units are associated with and arranged adjacent the center joint.

17. A jointed shaft as claimed in claim 14, wherein one of the two roller displacement units is associated with the center joint and is arranged adjacent thereto and the other roller displacement unit is associated with and arranged adjacent a fixed constant velocity joint at an end one of the shaft sections.

18. A jointed shaft as claimed in claim 17, wherein the two roller displacement units are associated with the same shaft section.

19. A jointed shaft as claimed in claim 17, wherein the two roller displacement units are associated with different shaft sections.

20. A jointed shaft as claimed in claim 14, wherein the center joint comprises an inner hub and an outer hub, said outer hub being connected to an inner part of a first displacement unit, and said inner hub being connected to an inner part of a second displacement unit.

* * * * *